(12) United States Patent
Jennings

(10) Patent No.: US 10,291,098 B2
(45) Date of Patent: May 14, 2019

(54) DRIVE SYSTEM HAVING AN ELECTRIC MOTOR AND TRANSMISSION

(71) Applicant: MOMENTUM TECHNOLOGIES GMBH, Monchengladbach (DE)

(72) Inventor: Steven Jennings, Bruggen (DE)

(73) Assignee: MOMENTUM TECHNOLOGIES GMBH, Monchengladbach (DE)

( * ) Notice: Subject to any disclaimer, the term of this patent is extended or adjusted under 35 U.S.C. 154(b) by 302 days.

(21) Appl. No.: 15/300,493

(22) PCT Filed: Mar. 31, 2015

(86) PCT No.: PCT/EP2015/057103
§ 371 (c)(1),
(2) Date: Sep. 29, 2016

(87) PCT Pub. No.: WO2015/150418
PCT Pub. Date: Oct. 8, 2015

(65) Prior Publication Data
US 2017/0126094 A1    May 4, 2017

(30) Foreign Application Priority Data

Mar. 31, 2014   (DE) .................. 10 2014 104 494

(51) Int. Cl.
*H02K 7/116* (2006.01)
*B65G 23/08* (2006.01)
(Continued)

(52) U.S. Cl.
CPC ............ *H02K 7/116* (2013.01); *B65G 23/08* (2013.01); *H02K 3/50* (2013.01); *H02K 5/04* (2013.01);
(Continued)

(58) Field of Classification Search
CPC .......... H02K 7/116; H02K 7/14; B65G 23/08; B65G 23/04
See application file for complete search history.

(56) References Cited

U.S. PATENT DOCUMENTS 2,966,078 A * 12/1960 Wright .................. B65G 23/08
                                                 198/500
2,997,608 A *  8/1961 Musser ............... H02K 7/1012
                                                 198/835
(Continued)

FOREIGN PATENT DOCUMENTS

DE          1965548      7/1971
DE         20308665     12/2004
(Continued)

OTHER PUBLICATIONS

K. Atallah et al., "A New PM Machine Topology for Low-Speed, High-Torque Drives," IEEE Proceedings of the 2008 International Conference on Electrical Machines, 2008 (4 pages).

*Primary Examiner* — Edgardo San Martin
(74) *Attorney, Agent, or Firm* — Hamre, Schumann, Mueller & Larson, P.C.

(57) ABSTRACT

A drive system, in particular for applications in conveying technology and the food industry, having a fixed shaft, an electric motor including a rotor rotatable about the shaft and a stator, a transmission, and a drum configured to be driven by the transmission at a reduced rotational speed and concentrically rotatable about the shaft. The rotor and the transmission are arranged within the drum, and the stator of the electric motor is arranged outside the drum.

13 Claims, 3 Drawing Sheets

(51) Int. Cl.
    *H02K 3/50*     (2006.01)
    *H02K 5/04*     (2006.01)
    *H02K 7/14*     (2006.01)
    *H02K 9/02*     (2006.01)
    *H02K 9/19*     (2006.01)
    *H02K 7/10*     (2006.01)
    *B65G 23/02*     (2006.01)

(52) U.S. Cl.
    CPC .............. *H02K 7/14* (2013.01); *H02K 9/02* (2013.01); *H02K 9/19* (2013.01); *H02K 2213/03* (2013.01)

(56) References Cited

U.S. PATENT DOCUMENTS

| | | | | |
|---|---|---|---|---|
| 5,180,344 A * | 1/1993 | Hall | .............. | B65G 23/08 |
| | | | | 474/148 |
| 5,239,221 A * | 8/1993 | Juan | .............. | H02K 5/15 |
| | | | | 310/216.009 |
| 5,442,248 A | 8/1995 | Agnoff | | |
| 7,129,608 B2 * | 10/2006 | Eppler | .............. | H02K 1/148 |
| | | | | 310/89 |
| 7,299,915 B2 * | 11/2007 | El-Ibiary | .............. | B65G 23/08 |
| | | | | 198/780 |
| 8,365,903 B2 | 2/2013 | Schmidt et al. | | |

FOREIGN PATENT DOCUMENTS

| | | |
|---|---|---|
| DE | 102008039837 | 3/2010 |
| GB | 2472020 | 1/2011 |
| WO | 2007125284 | 11/2007 |
| WO | 2013143550 | 10/2013 |

* cited by examiner

DRIVE SYSTEM HAVING AN ELECTRIC MOTOR AND TRANSMISSION

FIELD

The present invention relates to a drive system having an electric motor and a transmission for driving a rotatable drum, in particular for use in conveying technology and/or where stringent requirements in respect of cleanliness have to be met.

BACKGROUND

Geared motors are used in many areas of mechanical engineering in order to generate rotary or linear movements. Electric motors are typically operated at relatively high rotational speeds, even though only a relatively low torque is generated. A transmission can reduce the rotational speed in a suitable ratio, the torque being increased correspondingly.

Electric motors having a transmission are often used in conveying technology in order to drive rollers or conveyors either directly or by means of belts, in particular toothed belts.

In applications in which there is only a small amount of space available and/or specific requirements in respect of cleanliness and hygiene have to be met, conventional geared motors cannot be used in optimum fashion. They often require too much space and/or they cannot be cleaned with a justifiable level of outlay. For such applications, use is often made of so-called drum motors, as are described, for example in WO 2013/143550 A1. Such drives are very compact, because the free volume within a drum is used to accommodate an electric motor and an associated transmission. The torque is generated within the drum and transmitted to the drum in order thus to drive a load. Drum motors therefore have a fixed inner shaft with a drum which rotates about the shaft and in which the drive is accommodated. This requires an electrical supply line, which is generally routed within the fixed shaft. The task of sealing the same in relation to oil, which can creep along the supply line, is difficult and can give rise to hygiene-related problems if used in the food industry.

Furthermore, GB 2472020 A discloses a drum motor which has an outer stator and an inner rotor and in which the stator and rotor are provided within the drum.

Moreover, a further fundamental problem is the fact that the electric motor has available only a relatively small diameter within the drum, the rotor and stator of the electric motor having to be accommodated within said diameter. This means, in general terms, that only a relatively low torque can be generated, since the electric-motor torque which can be generated increases approximately in proportion with the square of the diameter of the electric motor. It is also the case in an electric motor that increasing power gives rise to more and more heat, which has to be dissipated, this only being possible in practice, in the case of drum motors, via the surface of the drum, and this place pronounced limitations on the power of the electric motor in the interior of the drum.

SUMMARY

Taking this situation as the departure point, it is an object of the invention to provide a drive system which largely avoids the aforementioned disadvantages and is nevertheless of straightforward construction, easy to clean and can be used where there are constricted space conditions and stringent requirements in respect of cleanliness have to be met.

A drive system according to the invention has a fixed shaft, also has an electric motor, which has a rotor, which can be rotated about the shaft, and a stator, further has a transmission for reducing a rotational speed of the rotor, and additionally has a drum which can be driven by the transmission at a reduced rotational speed and can be rotated concentrically about the shaft, wherein the rotor and the transmission are arranged within the drum, and is characterized in that the stator of the electric motor is arranged outside the drum. According to the invention, the drum therefore rotates within the air gap between the stator and rotor of the electric motor, which gives rise to considerable advantages in terms of design and for the purpose of configuring the system. In contrast to a conventional drum motor, the drive system according to the invention has two mechanically independent components, that is to say a drum, with a rotor and transmission in the interior, and a stator, which is arranged outside the drum. The electric motor can thus generate a considerably greater amount of torque than in the case of conventional drum motors, since the diameter of the electric motor is no longer limited to the diameter of the drum. The space which is available in a drum motor for the stator and rotor together can now be utilized virtually entirely for the rotor.

The advantages of the invention, rather than being limited to a specific type of electric motor, can be realized in a similar manner by different types of electric motor. The important step is for only the rotor of the electric motor to be arranged within the drum. The rest of the components which are known from drum motors, in particular the transmission, can be transferred virtually without any changes being made, with the obvious exception being that it may be necessary to provide for a greater amount of power and a higher torque. It should also be pointed out, that depending on the type of transmission, the fixed shaft need not be continuous; rather, it may be interrupted by a transmission designed in the form of a connection between two shaft pieces, this possibly being the case, for example, in planetary transmission systems.

In a preferred embodiment of the invention, the stator wholly or partially encloses the drum, to be precise essentially only in the axial region in which, within the drum, the rotor is arranged. It is generally the case that the rotor is arranged in an end region of the drum, but this is in no way the only possible embodiment. There are also configurations in which, for example, the rotor and the externally arranged stator are arranged approximately centrally in relation to the drum.

It is particularly advantageous to configure the stator such that it only partially encloses the drum, in particular in the form of a half-shell or of a part-shell which encompasses only 180° or less of the outer circumference of the drum. This embodiment, which can be configured without any critical disadvantages for different types of electric motor, has the advantage that, when the drum is installed, the stator can be easily removed and, for example, changed over or cleaned.

A stator in the form of a half-shell also makes it possible to realize a system in which one half-shell-form stator can be supplemented, if required, by a second half-shell-form stator to form a stator which fully encloses the drum. On the one hand, a stator made up of two half-shells is particularly suitable for straightforward installation and cleaning; on the other hand, depending on the torque required, it is possible to provide just one half-shell, which then, if a higher torque is required, can be supplemented by a second half-shell. It is advantageous if a second half-shell is configured such that it can be plugged onto the first half-shell, in particular also with plug-in connections for the electrical supply lines for induction coils in the second half-shell. The two halves of a two-part stator may be of otherwise symmetrical configuration.

As already explained, the drum rotates in the air gap between the rotor and stator, and therefore, technically speaking, the distance between the stator and rotor, referred to generally as the air gap of an electric motor, is made up of an inner air gap between the outer circumference of the rotor and the inner circumference of the drum, of the thickness of the drum, and of an outer air gap between the drum and stator. The inner air gap between the rotor and inner circumference of the drum preferably has a first width of 0.5-2 mm, and the same goes for the outer air gap between the outer circumference of the drum and inner circumference of the stator. The drum itself has a thickness of between 0.2 and 5 mm. Overall, it is, of course, desirable to keep the distance between the rotor and stator as small as possible, but it has to be possible, even in the case of different amounts of thermal expansion or small amounts of maladjustment between the rotor and stator and in the case of contamination, for the drum to rotate between the rotor and stator at any rate in a contact-free manner.

A particularly preferred embodiment in the case of the present invention is one in which the stator has induction coils, which are intended to generate a traveling magnetic field and can be connected electrically to a power supply preferably via an electrical supply line with at least one releasable plug-in connection. Since the electrical energy necessary for operating the electric motor is fed to the stator, which is located outside the drum, two advantages can be achieved at the same time. On the one hand, the task of dissipating heat which is generated in the electric motor, and arises predominantly in the induction coils, is possible very much easier, and more effectively, than from the interior of the drum. On the other hand, the stator does not contain any movable components which would have to be lubricated with oil, and therefore the problem of sealing electrical supply lines in relation to exiting oil is also dispensed with. If use is made of a releasable plug-in connection, it is possible, even without specialist knowledge, for the stator to be easily removed and cleaned or exchanged for another stator, for example for a different supply voltage or power level.

In a preferred embodiment of the invention, the rotor is equipped with opposite poles, which may also be permanent magnets, as a result of which the construction of the rotor in the interior of the drum is very straightforward.

For high levels of power, it is proposed to equip the stator with passive or active cooling means. In the simplest case, these are, in particular, cooling ribs on the outside of the stator. It is also possible, however, to have active cooling means ranging from a fan to a water-cooling circuit.

The design according to the invention allows some freedom in the configuration of the drive system as a whole, because the larger dimensions of the rotor can generate more torque and there is therefore not as much need for the power to be made available by a high rotational speed. Overall, this results in the transmission preferably providing for gear reduction of the rotational speed of the rotor by a factor of 10-100, the torque being increased correspondingly.

Since the drum moves between the rotor and stator it is advantageous for the drum to be made from non-ferromagnetic material, preferably from stainless steel. Stainless steels are typically used particularly in the food industry where stringent requirements in respect of hygiene have to be met, since they are resistant to frequent cleaning. It is also the case that a low level of electric conductivity or the construction made of thin metal sheets which are insulated in relation to one another is advantageous, in order to keep eddy currents in the drum and the associated losses to a low level. Since only a small amount of heat has to be dissipated via the surface of the drum, it is also possible for materials which are poor conductors of heat, in particular plastic material or composite materials, to be considered for the drum.

In the case of a preferred embodiment of the invention, the electric motor and the transmission are arranged axially one behind the other, as is also the case in the case of conventional drum motors having a mechanical transmission. Depending on the space conditions, in particular if, on account of the construction of the transmission, it is not possible for a shaft to be guided through the entire transmission, it may be necessary for the purpose of supporting the components, for an inner tube located concentrically in relation to the drum to be arranged in the air gap, although this does not have any considerable adverse effect on the function of the system. The distance between the rotor and the stator then, in practice, accommodates two concentric components separated by three air gaps.

In the case of another preferred embodiment, however, the transmission is arranged more or less concentrically in relation to the rotor of the electric motor. The functioning of such an arrangement, also referred to as an electromagnetic transmission, is described in WO 07125284 A1. This principle can advantageously be integrated in the present invention by the drum, which rotates in any case in the air gap between the electric motor, being equipped on its circumference, in the region between the rotor and stator, with ferromagnetic elements, in particular axially running rods, namely in such a number and orientation that the drum is driven directly at a reduced rotational speed, as is described in WO 07125284 A1 for the relatively slowly rotating rotor. The principle of a motor having a concentric transmission is also described in the article "A New PM Machine Topology for Low-Speed, High-Torque Drives" by Kais Atallah et al. in "Proceedings of the 2008 International Conference on Electrical Machines" (Paper ID 1455), in which it is also possible to find examples of suitable arrangements of coils and opposite poles as are suitable in the present invention. Reference is made in full to this article and the disclosure thereof.

BRIEF DESCRIPTION OF THE DRAWINGS

Exemplary embodiments of the invention, to which this invention is not restricted, are explained in more detail hereinbelow, with reference to the drawing, in which.

DETAILED DESCRIPTION

Figure 1:
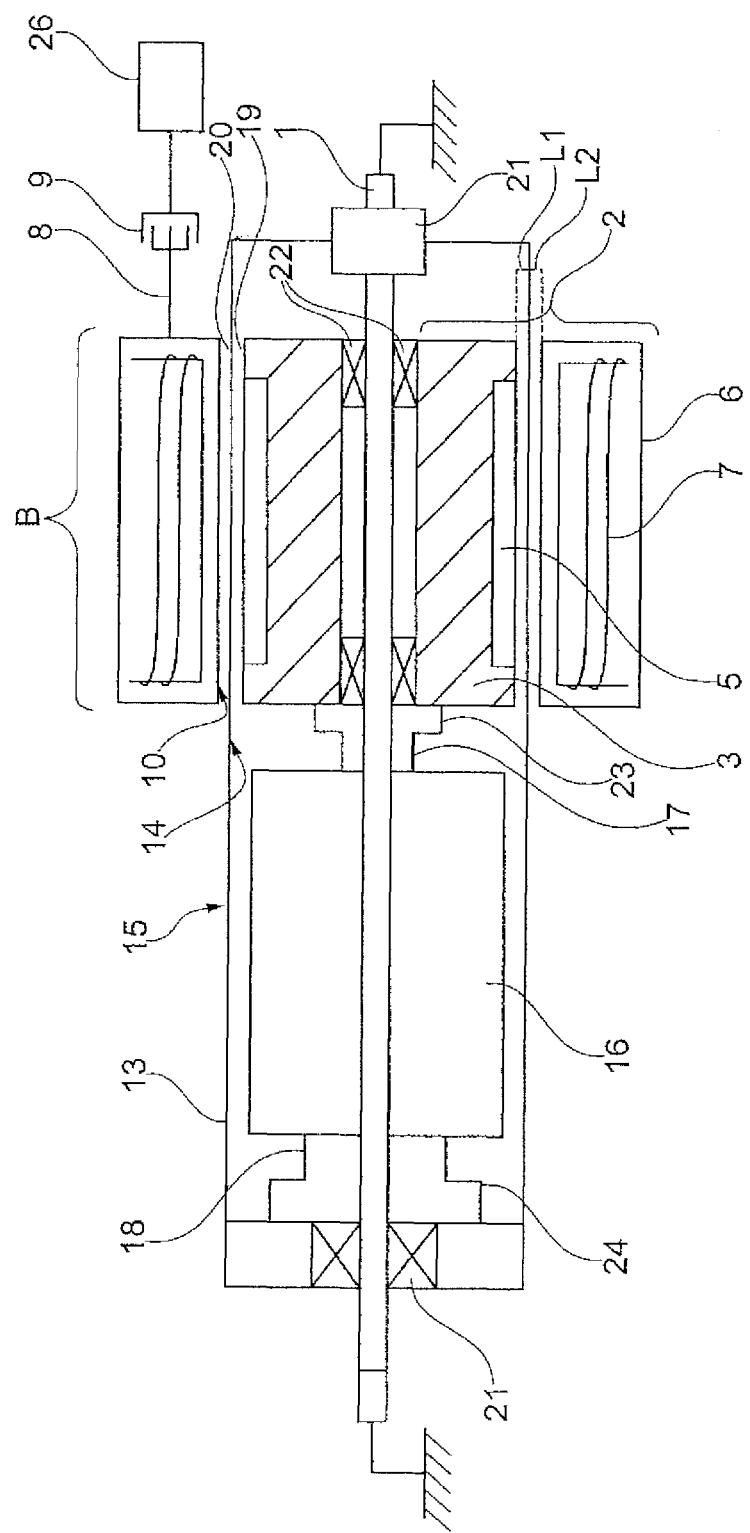
FIG. 1: shows a schematic longitudinal section through a drive system according to the invention.

FIG. 1 illustrates the drive system according to the invention schematically in longitudinal section. The rotor 3 of an electric motor 2 is mounted in a rotatable manner on a fixed shaft 1 by means of bearings 22. In the present exemplary embodiment, the rotor 3 has opposite poles 5, and therefore the rotor 3 can be made to rotate by means of traveling magnetic fields applied from the outside. This rotation is transmitted to an input shaft 17 of a transmission 16 by means of a rotor coupling 23. The transmission gears down this rotation in a manner known per se, and therefore an output shaft 18 of the transmission 16 (or, depending on the construction, the housing thereof) rotates more slowly than the input shaft 17, but provides for a relatively high level of torque. By means of a drum coupling 24, this rotation is transmitted to a drum 13, which encloses the rotor 3 and the transmission 16. This drum is mounted in a rotatable manner on the fixed shaft 1 by means of a drum-bearing means 21 and is of essentially cylindrical form, although it is also possible for this drum 13 to have different diameter portions. The rotor 3 is located in a specific region B in the drum 13. In this region B, the drum 13 is at least partially surrounded on the outside by a stator 6, which has induction coils 7 for generating a traveling magnetic field. The induction coils 7 are supplied with power from a power supply 26 via an electrical supply line 8, wherein a releasable plug-in connection 9 is present in order to make it easier for the stator 6 to be removed. An outer air gap 20 having a first width L1 of 0.2-2 mm [millimeter] is located between the inner circumference 10 of the stator 6 and the outer circumference 15 of the drum 13. Furthermore, an inner air gap 19 having a second width L2 of likewise approximately 0.2-2 mm is located between the outer circumference 4 of the rotor 3 and the inner circumference 14 of the drum 13. The drum 13 itself, in the region B, has a thickness of 0.5-5 mm, and therefore, for the electric motor 3 as a whole, there is a distance of 0.9-9 mm between the rotor 3 and stator 6. The efficiency of the electric motor 3 increases as this distance decreases, but the drum 13 always has to be freely rotatable between the rotor 3 and stator 6, namely even in the case of different amounts of thermal expansion for these components or in the case of slight bending, imbalance or contamination of the drum 13.

Figure 2:
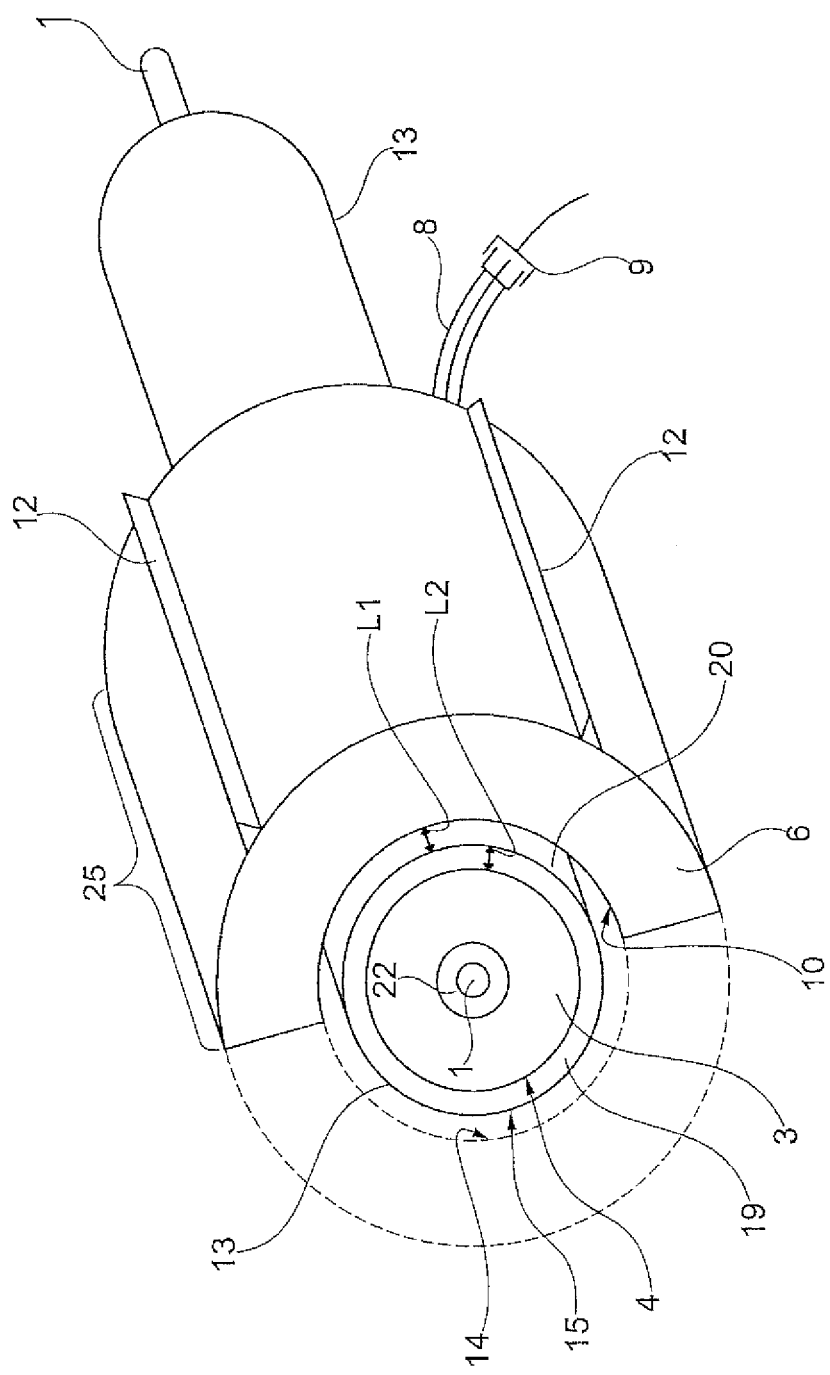
FIG. 2: shows a schematic perspective view of FIG. 1 proceeding from a cross section in the region of the electric motor.

FIG. 2 shows, schematically, a perspective view of the drive system proceeding from a cross section through the region B, in which the electric motor 2 is arranged. The shaft 1 is surrounded concentrically by a bearing 22 of the rotor 3 and by the rotor 3 itself. The inner air gap 19 having a width L2, which in the present image has been exaggerated in size for clarification purposes, is located between the outer circumference 4 of the rotor 3 and the inner circumference 14 of the drum 13. The outer air gap 20 (likewise exaggerated in size) having a width L1 is located between the outer circumference 15 of the drum 13 and the inner circumference 10 of the stator 6. Outside the drum 13, the stator 6, which may be constructed in different ways according to the invention, is located concentrically in relation to the fixed shaft 1, the rotor 3 and the drum 13. It is possible for the stator 6, as indicated by dashed lines, to enclose the drum 13 fully, but also to be constructed in two or more parts from part-shells or even to comprise just one half-shell 25, which encloses the drum 13 only over 180° of its circumference or less. In the case of such an embodiment, the stator 6 is easy to remove, which may be useful for the purposes of cleaning or alteration or in the case of the power, or power supply, of the system being changed. If the stator 6 is to be made up of two symmetrical half-shells 25, it is particularly advantageous to provide electrical plug-in connections 27 between the two half-shells 25 so that, when two half-shells 25 are assembled to form a stator 6, it is possible to connect simultaneously the power supply for induction coils 7 in the two half-shells. The stator 6 is preferably equipped with cooling means 12, in the present exemplary embodiment cooling ribs, which ensure good heat dissipation. The stator does not contain any movable parts and may be accommodated in a completely closed housing 11, in particular made of stainless steel. All that is required is for the electrical supply line 8 to be routed outward through this housing 11. In contrast to a supply line leading into the interior of the drum 13, in which oil from the transmission 16 or the bearings 21, 22 may be located, the feed-through to the stator does not give rise to any problems.

Figure 3:
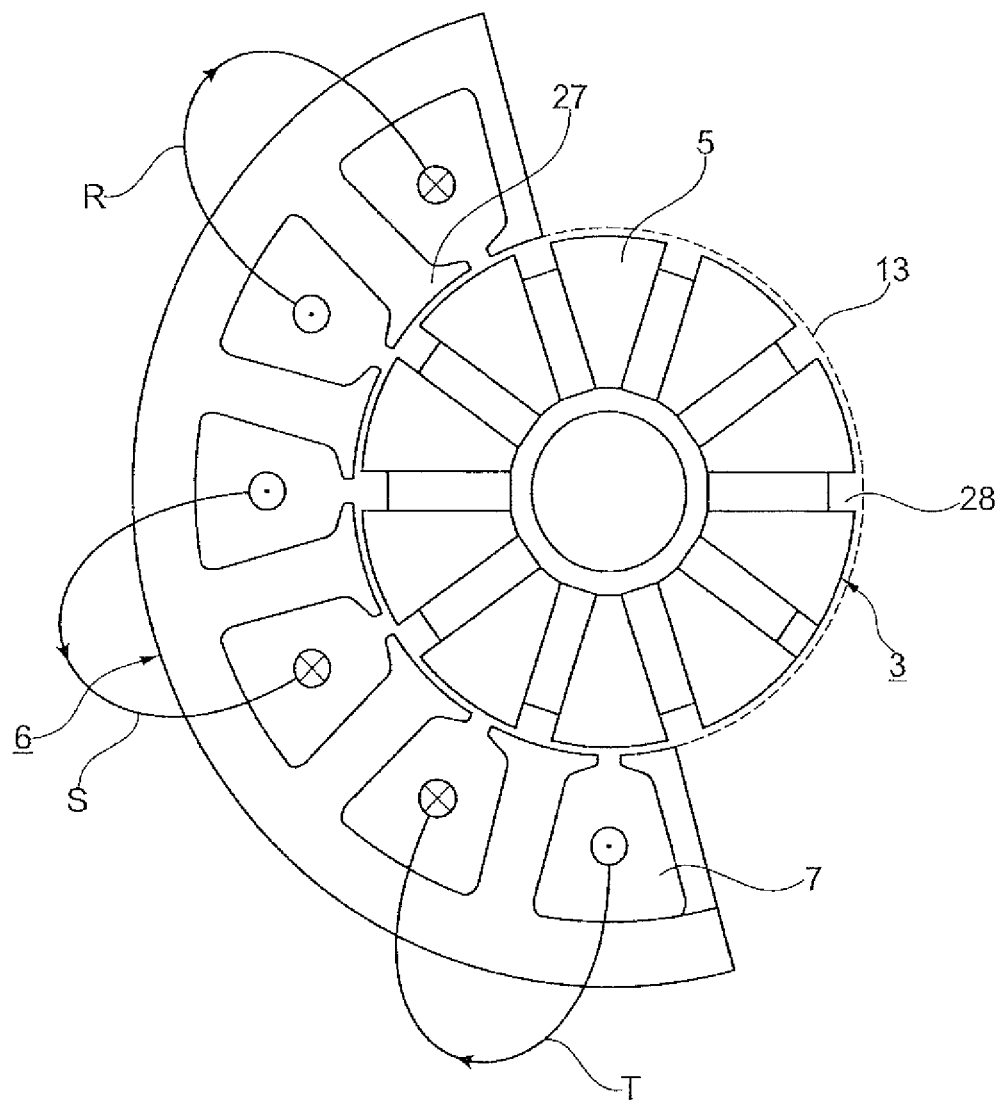
FIG. 3 shows a schematic view of the electrical arrangement of an exemplary embodiment with a half-shell-form stator.

FIG. 3 shows, in a schematic cross section, the electrical and/or magnetic construction of an exemplary embodiment of the invention having a half-shell-form stator 6. In this exemplary embodiment, the stator 6 contains three induction coils 7 and five whole, and two half, magnetic poles 27. The stator corresponds precisely to a half stator which has twelve magnetic poles, and which is halved through two magnetic poles. Three induction coils 7 are fed with electric currents R, S, T having a rotating electric field which makes a rotor 3 rotate. The rotor 3, in the present exemplary embodiment, has 10 opposite poles 5 separated by slots 28. Depending on the rotational speed desired, it is also possible to provide more or fewer opposite poles 5. A drum 13 is indicated merely by dashed lines in this figure. If use is made of an electromagnetic transmission for driving the drum 13, the latter may likewise be equipped with a suitable number of ferromagnetic elements, as is described in WO 07125284 A1.

It is basically possible, for the present invention, to use magnetic arrangements as are known from conventional drum motors. If use is made of half-shell-form stators and of an electromagnetic transmission, further conditions have to be fulfilled. If use is made of a half-shell-form stator and of a multi-phase power supply, the number of magnetic poles (two halves calculated as one) is equal to an even multiple of the number of phases, that is to say, in the case of a three-phase current (R, S, T), numbers 6, 12, 18, etc. Suitable magnetic arrangements for different gear down levels in the case of electromagnetic transmissions are known from the literature.

The present invention makes it possible to provide drive systems in the manner of a drum motor which have a relatively high level of power and better dissipation of heat, it also being the case that a stator arranged separately on the outside allows a high level of flexibility. In particular it is possible for the stator to be changed over, in order for the level of power to be changed or for adaptation to a different power supply, without the drum as a whole being removed. On the other hand, in the case of a stator being fixed on a system, it is also possible for the drum to be withdrawn, or changed over, individually. If use is made of a stator comprising one or two half-shells, the flexibility of the arrangement can be increased further still. This allows the invention to be used, in particular, in conveying systems and, quite particularly, in the food industry where stringent requirements in respect of hygiene and cleanliness have to be met.

LIST OF REFERENCE NUMERALS

1 Fixed shaft
2 Electric motor
3 Rotor
4 Outer circumference of the rotor
5 Opposite poles 6 Stator
7 Induction coils
8 Electrical supply line
9 Releasable plug-in connection
10 Inner circumference of the stator
11 Housing of the stator
12 Cooling means
13 Drum
14 Inner circumference of the drum
15 Outer circumference of the drum
16 Transmission
17 Input shaft
18 Output shaft
19 Inner air gap
20 Outer air gap
21 Drum-bearing means
22 Bearing of the rotor
23 Rotor coupling
24 Drum coupling
25 Half-shell
26 Power supply
27 Electrical plug-in connection
L1 First width of the outer air gap
L2 Second width of the inner air gap
B Region of the rotor
R, S, T Phases

The invention claimed is:

1. A drive system comprising:
a fixed shaft;
a drum concentric to the shaft and rotatable about the shaft;
an electric motor including a rotor and a stator the rotor is rotatable about the shaft and is arranged within the drum, and the stator is arranged outside the drum;
a transmission arranged within the drum and configured to drive the drum at a reduced rotational speed relative to a rotational speed of the rotor whereby the drum and the rotor can rotate at different rotational speeds.

2. The drive system as claimed in claim 1, wherein the stator wholly or partially encloses the drum in an axial region in which the rotor is arranged.

3. The drive system as claimed in claim 2, wherein the stator only partially encloses the drum in a circumferential direction, and the stator encompasses 180° or less of an outer circumference of the drum.

4. The drive system according to claim 1, wherein the stator is formed from two half-shells which, together, fully enclose the drum in a circumferential direction.

5. The drive system according to claim 1, wherein an inner air gap is present between an outer circumference of the rotor and an inner circumference of the drum.

6. The drive system according to claim 1, wherein an outer air gap is present between an inner circumference of the stator and an outer circumference of the drum.

7. The drive system according to claim 1, wherein the stator has induction coils configured to be connected electrically to a power supply and generate a traveling magnetic field that rotates the rotor.

8. The drive system according to claim 1, wherein the rotor is equipped with opposite poles.

9. The drive system according to claim 1, wherein the stator has passive or active cooling means.

10. The drive system according to claim 1, wherein the transmission is configured for gearing down the rotational speed of the rotor by a factor of 3 to 100, the torque being increased correspondingly.

11. The drive system according to claim 1, wherein at least one of the drum and a housing of the stator consists of non-ferromagnetic material.

12. The drive system according to claim 1, wherein the transmission is arranged axially alongside the rotor.

13. The drive system according to claim 1, wherein the transmission is arranged concentrically in relation to the rotor, and the drum, in the region of the rotor, is provided in a circumferential direction with rod-like ferromagnetic elements which drive the drum at a reduced speed in the magnetic field of the stator and rotor.

* * * * *